Figure 3:
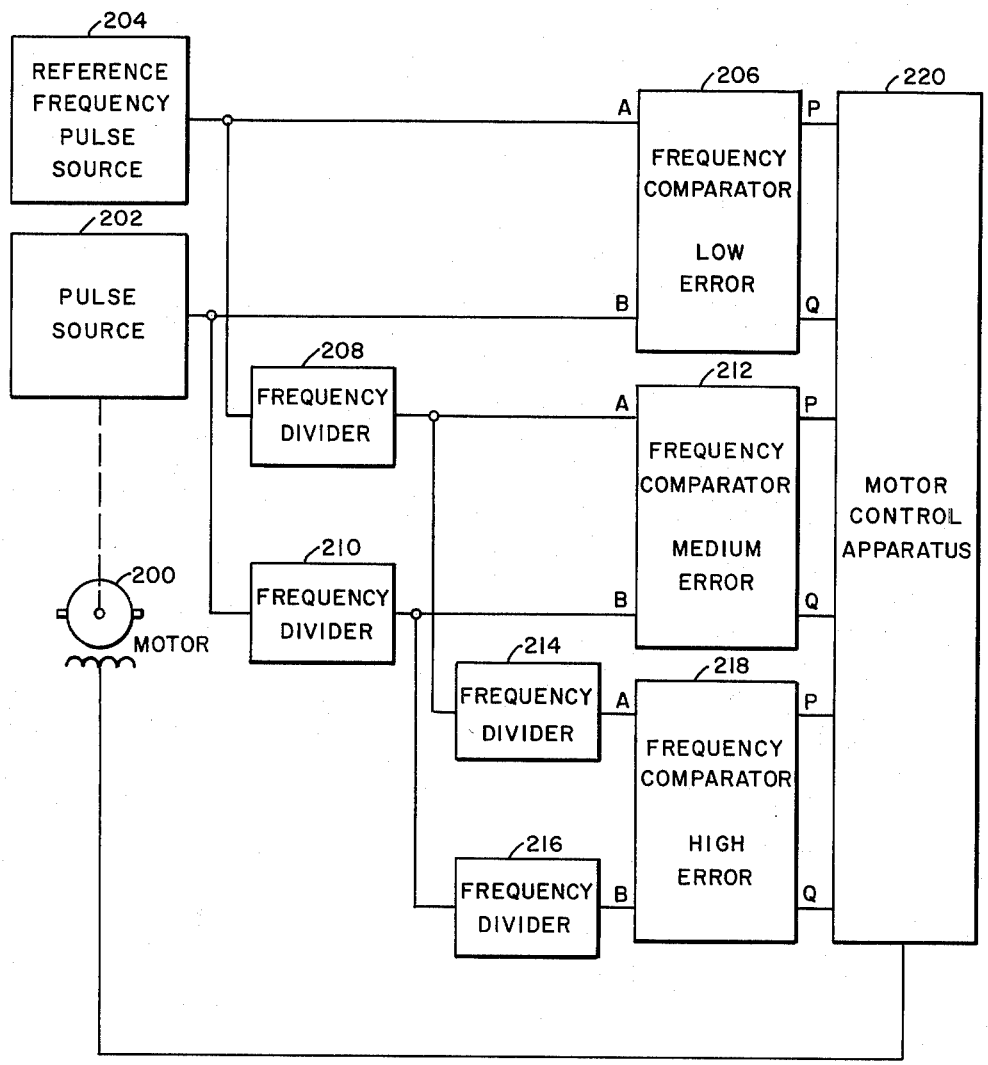

Oct. 5, 1965     W. D. ROWE ET AL     3,210,565
FREQUENCY COMPARATOR
Filed Jan. 2, 1962                    2 Sheets-Sheet 1
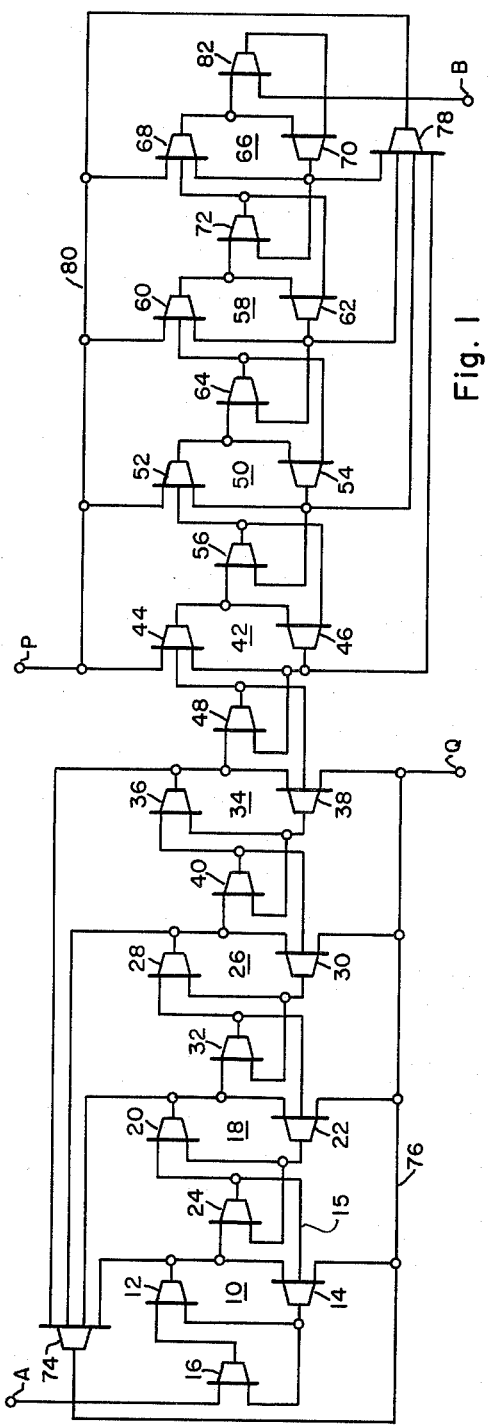
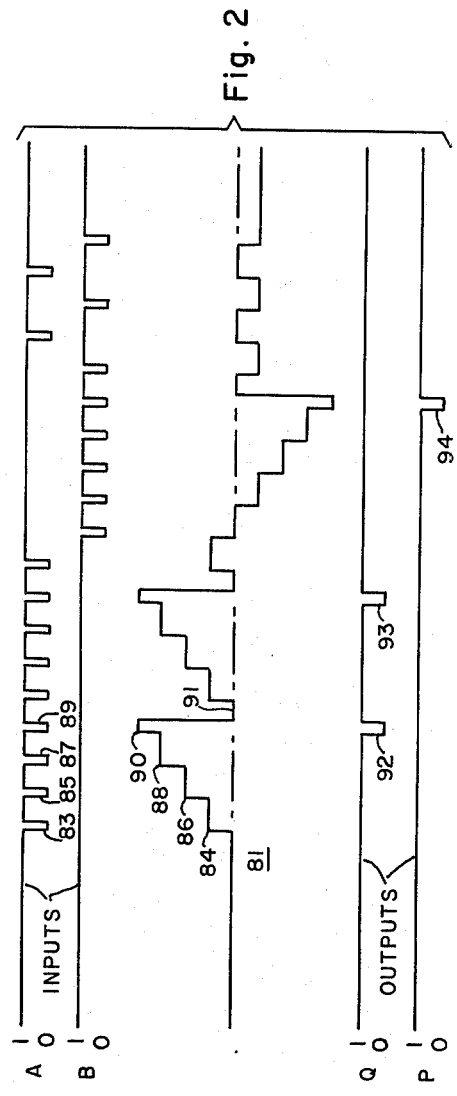

United States Patent Office 3,210,565
Patented Oct. 5, 1965

1

3,210,565
FREQUENCY COMPARATOR
William D. Rowe, Scituate, Mass., and Leif Solsnes, Trondheim, Norway, assignors to Westinghouse Electric Corporation, East Pittsburgh, Pa., a corporation of Pennsylvania
Filed Jan. 2, 1962, Ser. No. 163,695
3 Claims. (Cl. 307—88.5)

This invention relates in general to a frequency comparator circuit, and in particular, to a frequency comparator circuit utilizing a plurality of bistable storage devices.

In prior art speed and frequency control apparatus, as well as in frequency measuring instruments, it is often desirable to compare the frequency of two signals as, for example, comparing the frequency produced by an instrument attached to the shaft of a rotating machine, the frequency being directly proportional to rotating machine speed, with a standard or reference frequency and if desired utilizing the difference signal obtained to control the rotating machine. Frequency comparator circuits in general are well known in the art, and many of these circuits utilize storage devices into which are fed pulse signals representative of the frequencies to be compared. These prior art circuits utilize storage devices arranged to form counting circuits, which latter circuits, when arranged to form a frequency comparator, are very complex, involve a great deal of circuitry, and demand precise accuracy in the elements used.

Accordingly, it is an object of the present invention to provide a frequency comparator circuit which is more economical and simple in design.

It is a further object to provide a signal comparator circuit utilizing storage devices, which can better compare uniformly spaced as well as non-uniformly spaced pulse signal trains in a relatively more simple manner.

In accordance with the objects of the present invention, there is provided a plurality of bistable storage devices, with suitable gating devices located between successive storage devices, and operable such that a given input pulse applied to the first bistable storage device changes its state of operation which in turn causes the next succeeding bistable storage device to change its state of operation and at the same time restore the initial storage device to its original state. This action occurs until this given input pulse is applied to the last storage device, wherein it is retained. Any succeeding input pulses are likewise transferred down the line of storage devices, until all of the storage devices have change their state of operation.

The present invention uses this basic principle by applying first input pulses to one end of the plurality of storage devices, and by applying second and different input pulses to the other end of the plurality of storage devices. The first input pulse signal train tends to place the storage devices all in one state of operation, and the second input pulse signal train tends to place the storage devices in the opposite state of operation. By sensing when all the storage devices are in either of the first or second state of operation, an indication may be obtained to determine which is the higher frequency input pulse signal.

The above stated, and further objects of the present

2 invention will become apparent upon a reading of the specification and reference to the drawings in which:

FIGURE 1 shows a frequency comparator circuit in accordance with the present invention;

FIG. 2 is a graph illustration to show the relation between first and second input pulses, the states of operation of the storage devices used within the comparator circuit of the present invention, and the output indications obtained from the comparator circuit; and FIG. 3 is a block diagram of apparatus for controlling the speed of a motor by comparing the frequency of pulse signals produced by an instrument attached to the shaft of the motor, with a reference frequency signal.

Referring now to FIG. 1, there is shown an array of storage devices, which may take the form of bistable flip-flops 10, 18, 26, 34, 42, 50, 58 and 66. Each storage device, which is capable of operation in either of a ONE state or a ZERO state, may be comprised of two logic elements which may, for example, be NOR devices 12 and 14 for storage device 10, NOR devices 20 and 22 for storage device 18, NOR devices 28 and 30 for storage device 26, NOR devices 36 and 38 for storage device 34, NOR devices 44 and 46 for storage device 42, NOR devices 52 and 54 for storage device 50, NOR devices 60 and 62 for storage device 58, and NOR devices 68 and 70 for storage device 66. In order to control the transfer of input pulses to the various storage devices, there is provided a plurality of signal transfer control devices which are shown as gates 16, 24, 32, 40, 48, 56, 64, 72 and 82 and which gating devices may comprise NOR logic devices. NOR device 16 functions to receive pulse signals from input terminal A and gate them into storage device 10, NOR device 24 functions as an input gate relative to storage device 18 while also functioning as a reset gate for storage device 10, NOR device 32 functions as an input gate relative to storage device 26 while also functioning as a reset gate for storage device 18, in a similar manner NOR device 40 acts as an input gate for storage device 34 and a reset gate for storage device 26, NOR device 48 acts in a similar manner relative to storage devices 42 and 34, as does NOR devices 56 with respect to storage devices 50 and 42, NOR device 64 performs a similar function with respect to storage devices 58 and 50, and NOR device 72 operates in the same manner with storage devices 66 and 58.

Gate NOR device 82 functions to receive pulse signals from input terminal B and gate then into storage device 66.

In order to give an indication of the fact that when all of the storage devices are in the same one state of operation (for a purpose to be hereinafter described), there may be provided an output device such as logic device 74 operable to produce an output signal when all of the storage elements are in their ONE state of operation while simultaneously resetting storage devices 10, 18, 26 and 34 to their opposite or ZERO state of operation by means of reset line 76. Similarly, logic device 78 operates to produce an output signal when all of the storage devices are in their ZERO state of operation, and simultaneously to reset storage devices 42, 50, 58 and 66 back to their opposite or ONE state of operation.

With regard to the NOR devices shown, it is to be noted that a NOR device will produce a ZERO or no output signal if any one of its inputs is energized by a ONE signal, and will produce a ONE output signal if all of its inputs are not energized by ONE signals or stating it positively, are all energized by ZERO signals.

In the operation of the frequency comparator circuit of FIG. 1, any number of storage device stages may be used, such as the eight stages shown. Assuming that the state of operation of each storage device is determined by the output of its lower logic device, that is respectively elements 14, 22, 30, 38, 46, 54, 62 and 70, and further assuming that all of these storage devices are in a ZERO state of operation when the lower logic device is providing a ZERO output signal and the other or upper logic devices of each storage device are therefore providing a ONE output signal, an input pulse applied at input terminal A will be progressively shifted from storage device 10 to storage device 66, whereupon logic device 70 will then change its state of operation to provide a ONE signal. An additional input pulse applied at input terminal A will likewise be progressively shifted from storage device 10 to the storage device 58, thus changing the state of operation of logic device 62 to provide a ONE signal. This progressive shifting of each applied input pulse is controlled by the gating devices located between the successive storage stages. For example assuming that storage devices 58 and 66 are in a ONE state of operation, that is the logic devices 62 and 70 are each producing a ONE output signal, a ZERO input pulse applied at input terminal A (each input pulse is arbitrarily chosen as a ZERO signal) changes the output of logic device 16 so that it now produces a ONE output signal since both of its inputs are receiving ZERO signals. The ONE output signal from logic device 16 causes logic device 12 to now produce a ZERO output signal which causes logic device 14 to produce a ONE output signal and simultaneously causes logic device 24 to produce a ONE output signal. At this point it may be seen that storage device 10 has changed its state of operation, however, the ONE output signal from logic device 24 causes storage device 18 to also change its state of operation and simultaneously the storage device 10 shifts to a ZERO state of operation by virtue of the ONE signal from logic device 24 applied to logic device 14 through the conductor 15. This transfer operation is continued to progressively shift the stored ONE value signal to each successive storage device from the next preceding storage device, until the ONE value signal is stored in storage device 50. Since storage device 58 is already in a ONE state of operation, the logic element 62 is producing a ONE output signal which is applied to logic device 64 for holding it in a ZERO signal output condition thus preventing the change of state of storage device 50 to be transferred to storage device 58. This progressive shifting of input pulses continues until all of the storage devices are filled to capacity, that is until all have changed their state of operation from a ZERO to a ONE value.

In a somewhat similar manner it may be seen that ZERO input pulses applied to input terminal B are progressively shifted from storage device 66 in the direction of storage device 10, however the respective storage devices are here caused to change from a ONE state of operation to a ZERO state of operation.

In accordance with one preferred operation of the illustrated embodiment of the present invention, storage devices 42, 50, 58 and 66 are arbitrarily caused to have an initial ONE state of operation and storage devices 10, 18, 26 and 34 are arbitrarily caused to have an initial ZERO state of operation. If a ZERO pulse is now applied to input terminal A it will progressively shift from storage device 10 down to storage device 34 to change the state of operation of the latter device to a ONE value; conversely, if a ZERO input pulse is applied at input terminal B it will progressively shift from storage device 66 down to storage device 42 to change the state of operation of the latter storage device to a ZERO value. If a series train of ZERO input pulses is applied to input terminal A it will tend to change the state of operation of all the storage devices to a ONE value, and if a series train of ZERO input pulses is applied at input terminal B it will tend to change the state of operation of all the storage devices to a ZERO value. If the pulse train applied to input terminal A has a greater frequency than the pulse train applied to input terminal B, all of the storage devices will reach their ONE state of operation before they all reach a ZERO state of operation. Thus by determining which state of operation all the storage devices are in, an indication may be provided of which input pulse train has the greater frequency. In order to determine the state of operation of all the storage devices, suitable means may be provided which is responsive to the outputs of the various storage devices, such means may take the form of logic devices 74 and 78.

When the comparator circuit is in its "middle position" the first group of storage devices 10, 18, 26 and 34 is set in a ZERO state of operation such that the logic devices 14, 22, 30 and 38, are producing ZERO value output signals and the logic devices 12, 20, 28 and 36 are all producing ONE value output signals, which latter signals are applied to logic device 74 which in turn produces a ZERO value output signal. The second group of storage devices 42, 50, 58 and 66 is set in a ONE state of operation, such that the logic devices 46, 54, 62 and 70 are all producing ONE value output signals which are applied to the logic device 78 which in turn is also producing a ZERO value output signal.

If input pulses now applied at input terminal A have a greater frequency than input pulses applied at input terminal B, the storage devices will all reach the ONE state of operation before they reach the ZERO state of operation, and in this ONE state of operation, the logic devices 12, 20, 28 and 36, will produce ZERO output signals which are applied to the logic device 74. Since all of the signals applied to logic device 74 are ZERO signals, it will now produce a ONE value output signal which appears at terminal Q and which simultaneously acts along reset line 76 to reset the first group of storage devices 10, 18, 26 and 34 to their ZERO state of operation by the application of a ONE signal to the logic devices 14, 22, 30 and 38.

If the input pulses applied at input terminal B have a greater frequency, the state of operation of the storage devices 42, 50, 58 and 66 will change, such that the devices 46, 54, 62 and 70 will produce ZERO output signals which are applied to logic device 78 to produce a ONE value output signal that appears at terminal P and simultaneously resets the storage devices along reset line 80 to their ONE state of operation. Gating device 48 is operable with each group of storage devices to transfer pulses from and to either group depending upon which input frequency is the greater.

FIG. 2 illustrates more clearly in graphical form the operation of the comparator circuit of FIG. 1 upon the application of input pulses. Assume that the eight storage devices are initially set to their "middle position" that is, the storage devices are, from left to right, in the following states of operation: 00001111. A first pulse 83 applied to indicated terminal A produces a 00011111 state of operation of the storage devices, which is indicated by the first plateau 84 of curve 81. A second input pulse 85 produces a 00111111 state of operation, and is indicated by the plateau 86. A third input pulse 87 produces a 01111111 state of operation and is indicated by the plateau 88. A fourth input pulse 89 produces a 11111111 state of operation as indicated by the plateau 90, at which point the comparator circuit is reset to its above mentioned middle position as indicated at 91 and at which point an output pulse 92 appears at terminal Q.

A second output pulse 93 appears at terminal Q after the next four input pulses are applied at input terminal A. Subsequent and successive input pulses applied at input terminal B cause the comparator circuit to progressively go from its middle position of 00001111 to a state of operation of 00000000, at which time an output pulse 94 appears at output terminal P. If the respective frequencies of the input pulses applied at input terminals A and B are equal, the storage devices will not be filled to capacity in either of an all ONE state or an all ZERO state, and therefore no output pulses will appear at either of terminals Q or P. The comparator circuit will work equally well with ragged, that is non-uniformly spaced pulse trains, as well as uniformly spaced pulse trains.

With reference to FIG. 3, there is shown in block diagram, a practical motor control circuit for comparing an actual pulse frequency signal produced by a rotating machine such as a motor driving a pulse source, with a standard or reference frequency signal for the purpose of obtaining an error control signal to control the operation of the motor. In this motor control circuit is utilized a plurality of frequency comparator circuits such as shown in FIG. 1.

The motor 200 drives pulse source 202 which produces actual frequency pulses proportional to the actual speed of the motor. Pulse sources such as 202 are per se well known in the art and may take the form of a disc member operable with the shaft of the motor and which member contains discrete areas of magnetization around the periphery of the disc, which areas operate in conjunction with a magnetic pickup device to provide the desired pulses. Reference source 204 produces a standard frequency which is indicative of a desired speed. The reference frequency pulses and actual frequency pulses from the pulse source 202 are fed into a first frequency comparator device 206 in order to provide the fine or low error control of the motor. These same two pulse signals are also divided out by frequency dividers 208 and 210 to obtain sub-multiple frequencies of the two pulse signals, and which are fed into a second frequency comparator device 212 to obtain a medium control of the motor, and the two pulse signals may be further acted upon by frequency dividers 214 and 216 and fed to a frequency comparator device 218 to obtain a coarse or high error control of the motor. The output signal from each frequency comparator device may be fed into motor control apparatus 220, which is intended to include suitable means to provide analog voltages proportional to any output of the frequency comparators 206, 212 or 218. Such suitable means may include reversible binary counters for receiving the comparator output signals, with the outputs from the counters being fed into digital to analog converters. The analog signal voltages that may be obtained, can be utilized to modify the output of the motor speed controlling magnetic amplifier.

As an example, upon start up of the motor 200, the frequency of the pulses produced by the pulse source 202 will not be the same as the frequency of the standard pulses from the reference source 204. The latter respective pulses are fed into the frequency comparator device 206 which produces an output error signal. The same pulses are also fed into the frequency comparator device 212, after being divided by frequency dividers 208 and 210, and they are also introduced into the frequency comparator device 218 after being divided by the frequency dividers 214 and 216. The coarse frequency comparator 218 will provide the largest control signal to try to quickly correct the speed of the motor to the desired speed. At this point the frequency comparators 206, 212 and 218 are all providing error control signals. As the desired speed is reached, only the frequency comparator 206 will be providing an error control signal thus acting as a vernier control for the speed of the motor 200.

Although one embodiment of the present invention has been described with a degree of particularity, it is intended that the invention cover modifications obvious to one skilled in the art as well as modifications which fall within the spirit and scope of the invention as described.

We claim as our invention:

1. Signal comparison apparatus for comparing a first frequency input signal with a second frequency input signal and comprising, a first group of bistable storage devices responsive to said first input signal, with each of said storage devices providing one of a ONE and a ZERO output signal, a first plurality of gating devices each being operable with a different one of said storage devices to control the transfer of a ONE value stored signal relative to said one storage device from the next preceding storage device in response to said first input signal, a first output control device connected to each of said storage devices to produce a first output signal when all of said storage devices are providing a ONE output signal, a second group of bistable storage devices responsive to said second input signal, with each of said second group of storage devices providing one of a ONE and a ZERO output signal, a second plurality of gating devices each being operable with a different one of said second group of storage devices to control the transfer of a ZERO value stored signal relative to the latter said one storage device from the next preceding storage device in response to said second input signal, a second output control device connected to each of said second group of storage devices to produce a second output signal when said second group of storage devices are providing a ZERO output signal and signal comparison means operable with each of said first and second groups of storage devices for sensing the difference between the frequency of said first input signal and the frequency of said second input signal.

2. A signal comparison circuit for comparing the frequencies of a first input signal and a second input signal and comprising a first group of bistable storage devices responsive to said first input signal, with each of said devices having either one of a ONE and a ZERO state of operation, a first plurality of gating devices operable with said first group of storage devices to control the transfer of a stored signal successively through said storage devices in response to said first input signal, a first output gating device connected to each of said first group of storage devices to produce a first output signal when said first group of storage devices are all in a ONE state of operation, a second group of bistable storage devices responsive to said second input signal with each of said devices having either one of a ONE and a ZERO state of operation, a second plurality of gating devices operable with said second group of storage devices to control the transfer of a stored signal successively through said second group of storage devices in response to said second input signal, a second output gating device connected to each of said second group of storage devices to produce a second output signal when said second group of storage devices are all in a ZERO state of operation, and signal comparison means operable with each of said first and second groups of storage devices for sensing the difference between the frequency of said first signal and the frequency of said second signal.

3. Apparatus for comparing the relative frequencies of a first input signal with a second input signal comprising, a first group of memory devices responsive to said first input signal with each of said devices having either one of a first or second state of operation, a plurality of gating devices operable with said first group of memory devices to control the transfer of a first value stored signal to successive memory devices in response to said first input signal and being operable thereafter to change next preceding memory devices to a second state of operation, an output gating device connected to each of said first group of memory devices to produce an output signal when all of said first group of memory devices are in a first state of operation, a second group of memory devices responsive to said second input signal with each of said devices having either one of a first or second state of operation, a second plurality of gating devices operable with said second group of memory devices to control the transfer of a second value stored signal to successive memory devices in response to said second input signal and being operable thereafter to change next preceding memory devices to a first state of operation, an output gating device connected to each of said second group of memory devices to produce an output signal when all of said second group of memory devices are in a second state of operation and gating means operable in response to each of said first and second groups of memory devices for allowing said memory devices to attain said first state of operation when the frequency of said first input signal is greater than said second input signal, and allowing said memory devices to attain said second state of operation when the frequency of said second input signal is greater than said first input signal.

References Cited by the Examiner

UNITED STATES PATENTS

| | | | |
|---|---|---|---|
| 2,795,695 | 6/57 | Raynsford | 328—133 |
| 3,041,476 | 6/62 | Parker | 307—88.5 |
| 3,049,628 | 8/62 | Kaufman | 307—88.5 |
| 3,064,890 | 11/62 | Butler | 328—42 |

DAVID J. GALVIN, *Primary Examiner.*

ARTHUR GAUSS, *Examiner.*